Dec. 14, 1937.  J. D. DURANT  2,102,201
THERMOSTAT
Filed July 19, 1935   2 Sheets-Sheet 1
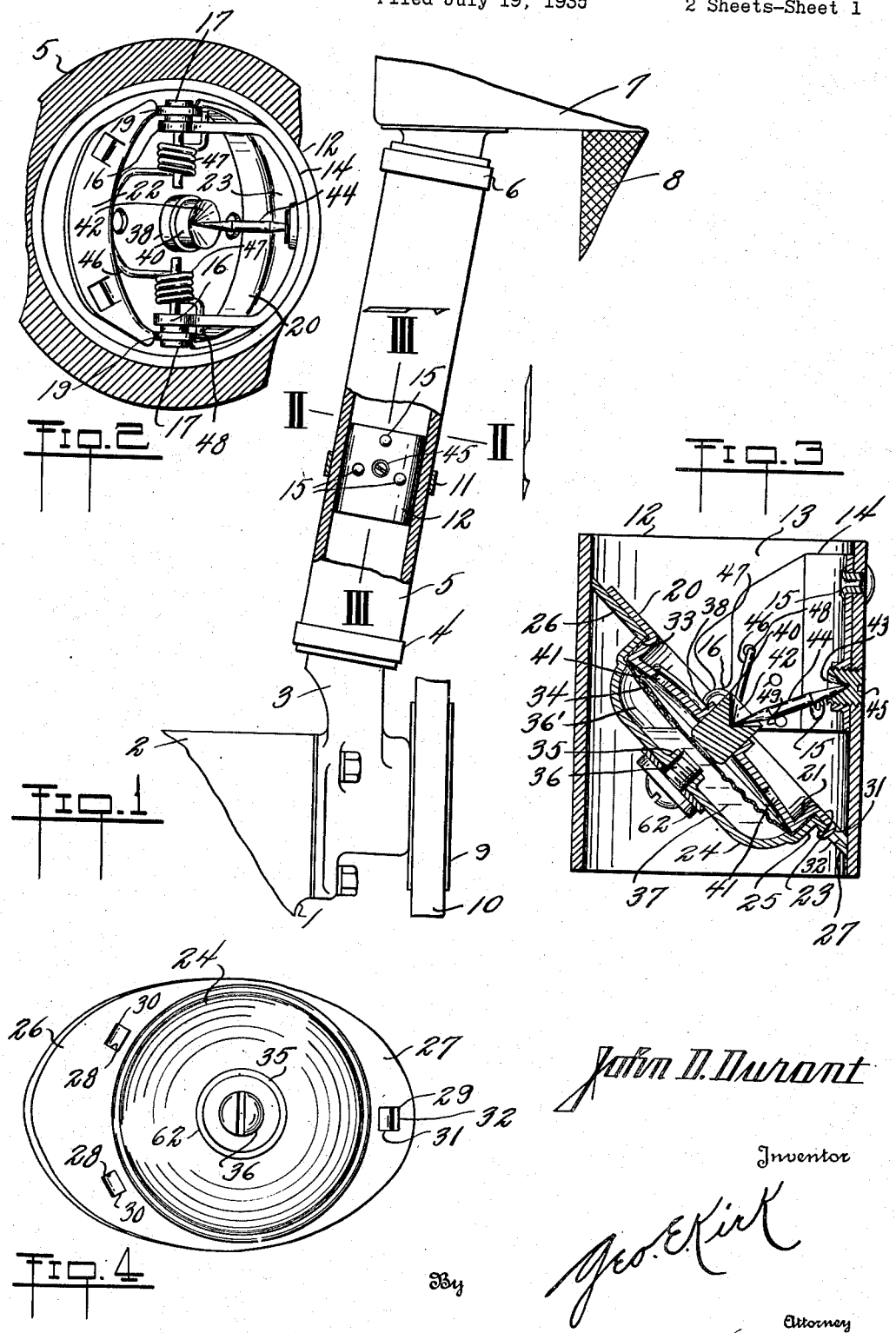

Dec. 14, 1937.  J. D. DURANT  2,102,201
THERMOSTAT
Filed July 19, 1935  2 Sheets-Sheet 2
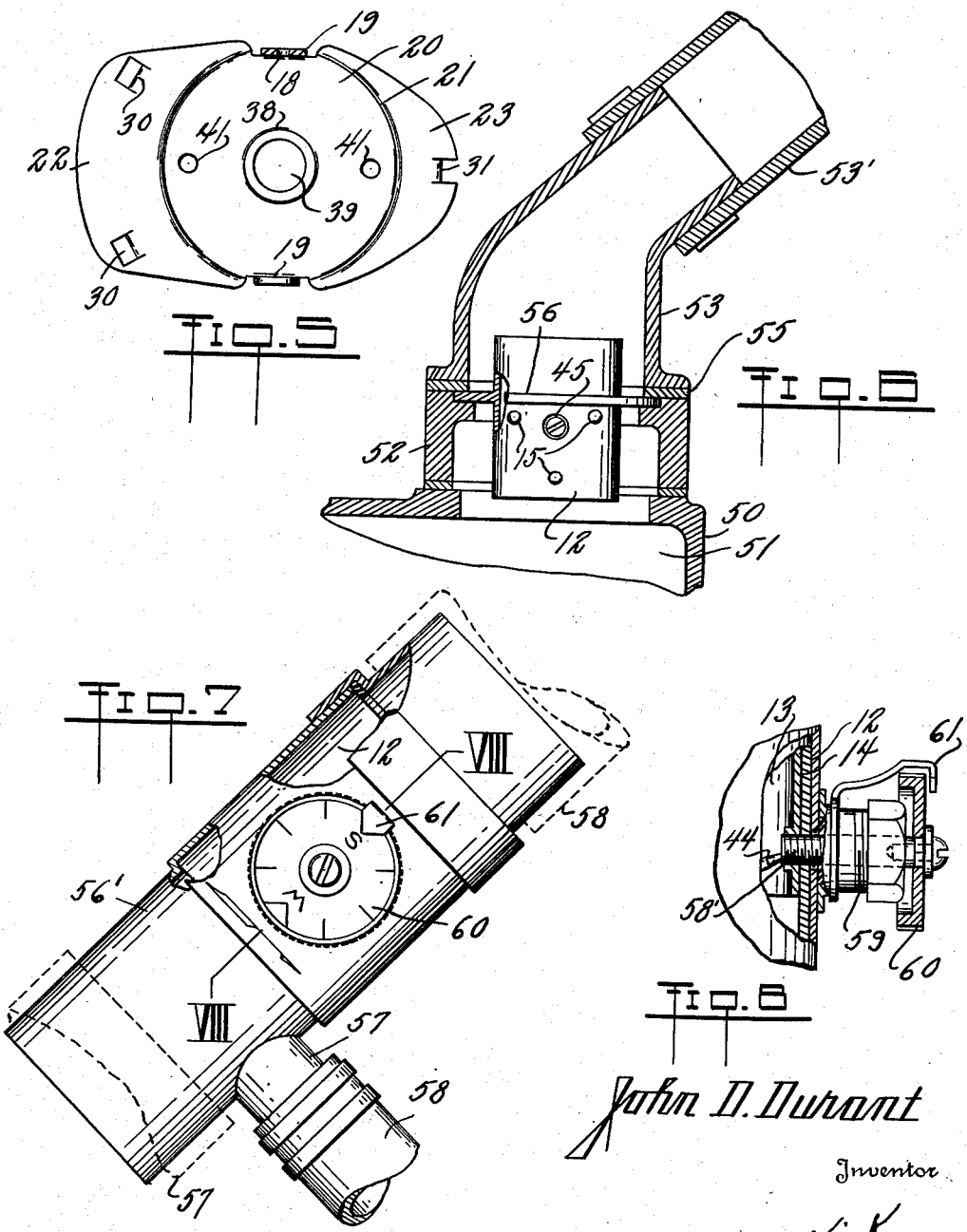
John D. Durant
Inventor
By Geo. E. Kirk
Attorney Patented Dec. 14, 1937

2,102,201

UNITED STATES PATENT OFFICE 2,102,201

THERMOSTAT

John D. Durant, Adrian, Mich., assignor to Schwarze Electric Company, Adrian, Mich., a corporation of Michigan Application July 19, 1935, Serial No. 32,243

3 Claims. (Cl. 236—34)

This invention relates to self-moving means as in response to fluid.

This invention has utility as a valve responsive to temperature, more particularly in a circuit involving fluid medium for an internal combustion engine in a so-called cooling system therefor.

Referring to the drawings:

Fig. 1 is a fragmentary view, with parts broken away, of an embodiment of the invention in the riser line of a liquid circuit cooling system for an internal combustion engine, as for Ford type of automobile;

Fig. 2 is a section on the line II—II, Fig. 1;

Fig. 3 is a section on the line III—III, Fig. 1;

Fig. 4 is a view of the movable portion of the device from the lower left of Fig. 3;

Fig. 5 is a detail view of the inner or minor member of the housing for the valve device from the opposite side of the view of Fig. 4;

Fig. 6 is a side elevation of the device having an assembly flange, and located at a riser, parts being broken away;

Fig. 7 is a fragmentary view showing mounting of the device at a T-fitting for water heater connection, and also showing adjustment for temperature response change; and Fig. 8 is a section on the line VIII—VIII, Fig. 7.

Internal combustion engine 1 has a water jacket portion 2 from which extends fitting 3 to which clamp 4 is effective to mount riser line or hose 5. This hose 5 is connected by clamp 6 with liquid receiving extension 7 from the upper portion of radiator 8 adapted to cool the liquid descending therethrough. This cooling is effected by travel of the vehicle by air passing through the openings of the radiator. Such flow of air may be increased by the action of a fan fixed with pulley 9 driven by belt 10 from the engine 1.

With the hose 5 resilient, the valve device of the invention herein may be thrust into a desired location therein, with either end of the valve uppermost. The resiliency of the hose may be sufficient to hold the device in position, but no injury should follow were the location of the device due to a subsequent shifting to be at an intermediate point, or even terminally of the hose either up or down. However, supplemental clamp 11 about the hose 5 may be so effective as to fix frictionally cylindrical or tubular member 12. One side of the central way 13 therethrough has fitted therein embracing means or U-shaped housing or bracket 14 (Fig. 2), anchored by rivets 15 against shifting as to the sleeve, shell or tube 12, of this valve device unit. The bracket 14 has diametrically disposed in the opening 13, a pair of spaced ears 16 providing aligned bearings as fulcra for pins 17 extending therethrough and toward each other. These pins 17 serve as trunnions in extending through openings 18 of offsets 19 to provide pivotal mounting from valve inner member 20 (Fig. 5). From the circular portion of the member 20 as surrounded by flange 21, there extends in one direction from the offsets 19, plate portion 22, and in the opposite direction, minor plate portion 23.

Companion or valve outer member 24 has from its central main body, flange 25 in which seats the flange 21 of the member 20. Extensions 26, 27, of the member 24 from the flange 25, are diametrically disposed and have therethrough openings 28, 29. Through the openings 28 extend tongues 30 from the plate 22, and through the opening 29 extends tongue 31 from the plate portion 23, in the assembly of the inner and outer housing members of the valve device. The tongue 31 through the opening 29 leaves clearance 32 (Fig. 3) providing a non-closing way through the valve device.

Between the flanges 21, 25, is mounted marginal annular offset 33 of concentrically corrugated wall 34. Centrally of the member 24 is offset 35 in which is mounted threaded plug or screw 36 in a position to space the wall 34 from hugging the inner side of the member 24. There is thus provided chamber 36' between the member 24 and the wall 34 into which may be introduced responsive medium 37, as ether, for less than the full capacity of the chamber 36'. This ether is expansible under temperature changes.

The member 20, centrally thereof and outward from the chamber 36, has annular offset 38 about opening 39 as a guide for plunger 40 directed toward the central wall 34 and the plug 36 therebeyond. The member 20 is convex away from the convex portion of the member 24. The member 20 at its convex portion thus provides a seat limiting the flexing of the wall 34 away from the member 24 and accordingly determines maximum capacity for the chamber 36'. Openings 41 through the convex portion of the member 20 allow exit and intake of liquid or gas to the space between the wall 34 and the member 20.

The plunger or member 40, movable as to the valve housing, has outwardly facing seat 42. The brace or mounting 12, intermediate the pair of bearings 18 has seat 43. These socket-like seats 42, 43, have therein terminally pointed strut 44. With the points of the ends of this strut 44 in the seats, friction as to relative movement is minimized for the longitudinally rigid strut. As the seat 43 is the inner portion of screw 45, the position of this seat 43 for adjusting the holding action of the strut is controllable.

The axis of the pins 17 is eccentric or slightly to one side of the tongue 31. This locates the plunger 40 off center. Torsion spring 46 (Fig. 2) from its central arm portion has coils 47 about the respective pins 17. This spring has termini 48 adjustably insertable into desired openings 49 of the ears 16, thereby to be effective in determining longitudinal force to be exerted through the contents of the chamber 36' upon the plunger 40 and therethrough against the strut 44 and the screw 45. As the pressure of the medium 37 in the chamber 36' acts to enlarge the chamber 36' by thrusting the flexible wall 34 toward the member 20, there is lever action to rock the housed valve device gradually on the fulcra in compensation of such expansion pressure strain. The valve opening 32 in rocking the member unit 20, 24, as to the opposing member 14 tends to minimize temperature differences between opposite sides of the chamber 36', as the openings 41 aid in this function. With this valve device constructed to open upon temperature rise, there is permitted increase in the flow volume of the jacket liquid of the engine. The adjustment may be such that this flow is responsive to approximate holding of a constant temperature.

Engine 50 (Fig. 6) has its water jacket chamber 51 in communication through collar 52 with fitting 53 connected to riser hose 53' adapted to extend to the radiator. Gasket 55 between the collar 52 and the fitting 53, may engage flange 56 on the tubular member 12. This is a simple positive anchoring of the temperature responsive or thermostatic device of this disclosure. As before indicated, there is operation, regardless of the direction toward which the device faces. The strut may accordingly be toward or away from the engine jacket.

Tubular fitting 56', between hose sections 57, 58, may serve to mount the device in the sleeve member 12 (Fig. 7). When it is desired to connect in a hot water heater, the fitting 56 may have a branch outlet 57 connected by line 58 to a hot water heater for the car. There is accordingly T-fitting 56', 57. In this T-fitting on the riser portion is the enlargement on which seats the member 12.

While adjustment of the screw 44 may be manual, usually it is not contemplated that such is to require adjustment in service. However, as between warm or summer weather and the cool or winter weather, there may be purpose for adjusting. Under these circumstances, the seat 43 may be in bolt or screw 58' (Fig. 8) extending through gland 59 and have graduated disk or plate 60 keyed to rotate therewith. Anchored with the gland 59 against rotation with the screw 58 is pointer 61. When such plate 60 is in position to have notation "S" at the pointer 61, there is such setting for this thermostatic device, including the chamber in the valve, that the temperature constant approximated for the control of the water-jacket circuit is lower or adapted for summer driving of the automobile.

When the plate 60 is rotated to bring "W" to the pointer 61, there is promoted engine operation at the warmer circuit to facilitate easy winter driving when a higher temperature is needed to give more heat to a car heater. Should the careful driver feel that some intermediate or other adjustment would be helpful, this adjustment of the screw 58 varies the thermal response of the rockable valve chamber.

To better withstand the pressures within the chamber 36', the plug 36 is equipped with compressible washer 62.

This disclosure is of a self-contained unit. With provision for the chamber 36' to hold pressure, there is thus provided a prime mover of considerable power. Such power from pressure will not cause destruction of the device. The concave inner side of the inner valve member 20 is effective to hold the wall 34 against distortion from over-pressure. The control medium is effective for effecting valve shifting when exposed in a quiet liquid, or for either direction therethrough of the liquid approach. The valve shifting is not disturbed by as much as six pounds pump pressure, from that shifting in quiet liquid. It is heat that gives the valve power, not water flow nor pressure. This minimizes possible temperature disturbance of the circulating liquid due to a circulating pump in a cooling system for internal combustion engines. The unit is substantial in itself against corrosive or other deterioration or disturbance from liquids or so-called anti-freeze solutions or compounds. The pitch of the threads for the adjusting screws 44, 58, in practice for re-positioning the seat 43 has been such that 90° turning of such screw has been effective for 25° F. change in the controlled temperature for the liquid of the circuit.

By placing the hot water heater connection as a by-pass below the thermostatic device of this disclosure, the heater in practice has been found effective for as much as half the volume of circulating liquid, due to the checking or choking action of the automatic valve herein, which rocking chamber valve in its preferred action is gradual in its shifting toward and from even fractional positions of opening.

What is claimed and it is desired to secure by United States Letters Patent is:

1. In connection with a thermostat installation, a rockable valve device embodying a U-shaped bracket member providing a pair of spaced aligned fulcra and an intermediate seat, a valve member having trunnion means mounted in said fulcra, there being means at said valve member including a chamber housing, a temperature expansion responsive medium, a plunger with a second seat thrust relatively to the valve member by the medium, a strut between the plunger seat and the first mentioned seat, and spring means opposing said thrust.

2. In connection with a thermostat installation, a rockable valve device embodying a U-shaped bracket member providing a pair of spaced aligned fulcra and an intermediate seat, a valve member having trunnion means mounted in said fulcra, means at said valve member including a chamber provided with a movable wall, temperature responsive medium in said chamber to act on said wall, a strut positioned between the intermediate seat and the movable wall, and torsion spring means for urging the valve member toward the strut.

3. In connection with a thermostat installation, a rockable valve device embodying a U-shaped bracket member providing a pair of spaced aligned fulcra and an intermediate seat, a valve member having trunnion means mounted in said fulcra, means at said valve member including a chamber provided with a movable wall, temperature expansion responsive medium in said chamber to act on said wall, a second seat movable by said wall, a strut mounted between the two seats, torsion spring means for urging the valve member toward the strut, and adjusting means for the said intermediate seat.

JOHN D. DURANT.